UNITED STATES PATENT OFFICE.

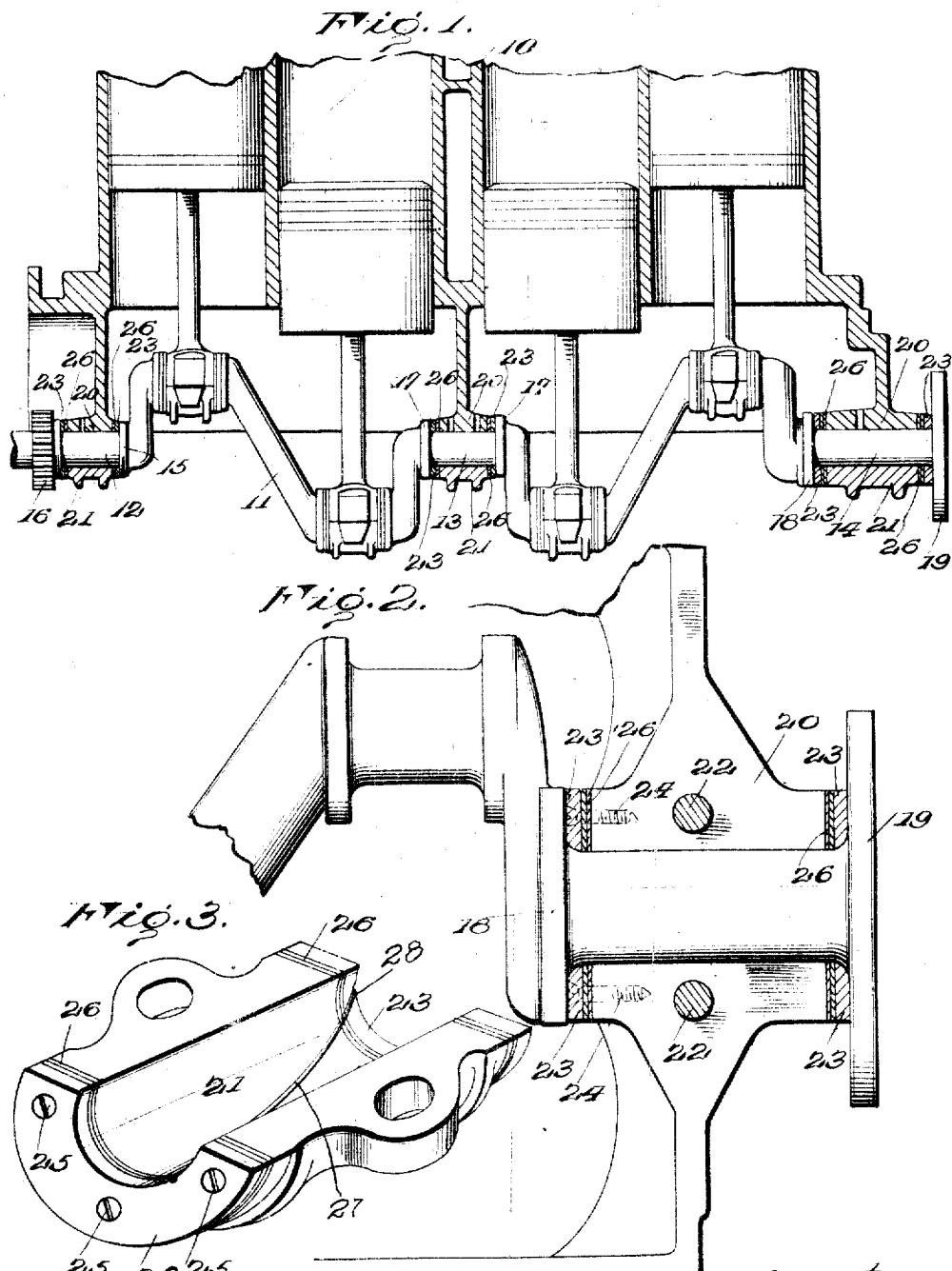

LEON L. SNYDER, OF COLFAX, WISCONSIN.

CRANK-SHAFT BEARING.

1,355,706.  Specification of Letters Patent.  Patented Oct. 12, 1920.

Application filed May 17, 1919. Serial No. 297,758.

*To all whom it may concern:*

Be it known that I, LEON L. SNYDER, citizen of the United States, residing at Colfax, in the county of Dunn and State of Wisconsin, have invented certain new and useful Improvements in Crank-Shaft Bearings, of which the following is a specification.

This invention relates to an improved crank shaft bearing for internal combustion engines and more particularly to a novel bearing for engines of the Ford type.

As is well known, in the Ford type of motor the fly wheel is bolted to the flange at the rear end of the crank shaft and the magnets of the magneto are in turn bolted to the fly wheel while the stationary magneto coils are carried by a plate connected to the rear end of the engine block. Consequently, as will be clear, end play in the crank shaft will result in movement of the magnets axially of said shaft toward and away from the magneto coils, causing faulty ignition. Furthermore, end play of the crank shaft tends to produce an undue strain at the wrist pin bearings of the connecting rods so that these bearings wear prematurely with resultant looseness. Unlike other motors, actuation of the clutch pedal in a motor of the Ford type for throwing in the low speed, acts to exert a direct rearward end pull against the engine crank shaft. Consequently, it will be seen that in this type of motor, end play of the crank shaft may well develop prematurely. The invention has as one of its principal objects, therefore, to provide a crank shaft bearing wherein end play of the crank shaft may be readily taken up.

The invention has as a further object to provide a bearing employing wear resisting face plates at opposite ends thereof so that end wear upon the bearing will be reduced to a minimum.

And the invention has as a still further object to provide a bearing of such construction that the crank shaft bearings of engines already in use may be readily modified in accordance with the invention.

Other and incidental objects will appear hereinafter. In the drawings—

Figure 1 is a fragmentary sectional view showing an engine of the Ford type equipped with my improved crank shaft bearing, Fig. 2 is a fragmentary plan view of a typical one of the bearings, the bearing cap being removed, and Fig. 3 is a perspective view showing the bearing cap in detail.

Referring now more particularly to the drawings, I have shown my improved bearing in connection with an engine block 10 of the Ford type. Rotatable upon this block is the crank shaft 11 provided with a front journal 12, an intermediate journal 13, and a rear journal 14. At the rear end of the front journal is a flange 15 while at the forward end of said journal is one of the timing gears 16 which, for the purposes of the present invention, may be considered as a flange. Flanges 17 are arranged at opposite ends of the journal 13. The journal 14 is provided at its forward end with a flange 18 and at its rear end with a somewhat larger flange 19 to which the engine fly wheel is bolted. As is well known, the engine block is, in ordinary practice, formed with a front, intermediate and rear bearing through which the journals of the crank shaft are respectively received and in the drawings I have shown all of these bearings constructed in accordance with the present invention. However, it should be observed that in practical use, it may be found necessary, in order to accomplish the desired objects, to provide an engine with only one or possibly two of my improved bearings to be used in conjunction with the remaining conventional bearings of the engine. Such an arrangement would, therefore, fall within the spirit of the present invention, I having shown all of the bearings of an engine constructed in accordance with the invention merely to bring out that an engine may have all of its bearings so constructed as well as that the bearing of the present invention may be used as a front, intermediate or rear bearing for the engine crank shaft. Since all of the bearings are identical, only one will be described in detail, the rear bearing being chosen. However, reference numerals applied to the parts of this bearing will be used upon corresponding parts of the front and intermediate bearings.

Referring especially to Figs. 2 and 3 of the drawings, it will be seen that I employ a half bearing 20 integral with the engine block. Mating with this half bearing is a bearing cap 21 engaging beneath the crank shaft and adjustably connected with the half bearing by fastening devices 22 at opposite sides of the cap. The cap is shown in detail in Fig. 3. The half bearing 20 and cap 21 are formed somewhat shorter than in ordinary practice to accommodate annular face plates 23 between the ends of the half bearing cap and the flanges 18 and 19. As suggested in Fig. 3, each of the plates 23 is formed of mating semi-circular sections. The upper sections of the plates are each adjustably secured to the ends of the half bearing 20 by a plurality of machine screws 24 while the lower sections of the plates are each similarly secured to the ends of the bearing cap by a plurality of machine screws 25. The heads of all of these screws are, of course, countersunk in the outer faces of the plates.

When first applied the face plates are of a thickness to fill the space between the ends of the half bearing and bearing cap and the flanges 18 and 19 of the crank shaft so that the face plates will thus coact with said flanges for supporting the crank shaft against axial movement. However, since the face plates will inevitably wear away, annular shims 26 are provided. These shims, like the face plates, are preferably each formed of mating semi-circular sections which are fitted beneath the sections of the face plates to be held by the fastening devices 24 and 25. Thus, the upper sections of the shims will bear between the upper sections of the face plates and the ends of the half bearing 20 while the lower sections of the shims will bear between the lower sections of the face plates and the ends of the bearing cap 21. Consequently, the effective length of the half bearing and bearing cap will be accordingly increased to take up wear in the face plates so that the face plates will again properly coact with the flanges 18 and 19 of the crank shaft for rigidly holding the shaft against axial movement. In this connection it will, of course, be understood that when the shims are employed to take up wear in any one of the bearings similar shims will, in any instance where more than one of the improved bearings is employed, be used at the same time to take up wear in the other bearings. Each cap 21 is preferably provided with a spiral lubricating groove 27 which extends across the inner faces of the end plates 25 and adjacent shims, as indicated at 28, so as to permit uniform lubrication of the bearing.

I accordingly provide a crank shaft bearing wherein end wear upon the bearing may be readily taken up as occasion may demand. However, in order to reduce the end wear upon the bearings to a minimum, the face plates 23 are preferably formed of material having high wear resisting qualities. As will be seen, my improved bearing is of such nature that the bearing may not only be easily incorporated in the construction of an engine at the time of its original manufacture, but any one or all of the bearings of an engine already in use may be easily modified in accordance with the invention by simply grinding down the ends of such bearing or bearings sufficiently to receive the face plates 23. As will be appreciated, the bearing is particularly applicable to an engine of the Ford type. However, I do not wish to be limited in this regard since the bearing may well be found equally as advantageous when used in connection with other types of engines.

Having thus described the invention, what is claimed as new is:

1. The combination with an internal combustion engine having a crank shaft provided with a journal and spaced annular flanges at opposite ends of the journal, of a semi-circular bearing and bearing cap arranged face to face and receiving the journal of the crank shaft, semi-circular wear resisting face plates disposed at the ends of said bearing and bearing cap, semi-circular shims interposed between the ends of said bearing and bearing cap and the adjacent face plates, and spaced fastening devices extending through said face plates and shims and into the bearing and bearing cap and having heads disposed substantially flush with the outer sides of said face plates and held from displacement by the annular flanges on the crank shaft.

2. The combination with an internal combustion engine having a crank shaft provided with journals and spaced annular flanges at the ends of the journals, of semi-circular bearings and bearing caps receiving the journals of said shaft, semi-circular wear resisting face plates secured to the ends of said bearings and bearing caps, semi-circular shims disposed between the ends of said bearings and bearing caps and said face plates, there being lubricating grooves formed in the bearing caps and extending across the inner faces of the adjacent shims and face plates and communicating with the outer sides of said face plates, and spaced fastening devices extending through said face plates, shims and bearings and bearing caps and having heads disposed substantially flush with the outer sides of said face plates and held from displacement by the annular flanges on the crank shaft.

3. In an internal combustion engine, a crank shaft having a journal and provided with spaced annular flanges at opposite ends of said journal, a bearing receiving the journal and formed of detachably united mating sections, wear resisting face plates conforming to and disposed at the opposite ends of the sections of the bearing, shims of substantially the same contour as the face plates interposed between said face plates and the adjacent ends of the sections of the bearing, and fastening devices extending through the face plates and shims and into the sections of the bearing, said fastening devices being provided with heads countersunk in the outer sides of the face plates and held from accidental displacement by engagement with the annular flanges on the crank shaft.

In testimony whereof I affix my signature.

LEON L. SNYDER. [L. S.]